United States Patent
Folgner et al.

(10) Patent No.: US 10,282,481 B2
(45) Date of Patent: May 7, 2019

(54) PROVIDING LINK TO PORTION OF MEDIA OBJECT IN REAL TIME IN SOCIAL NETWORKING UPDATE

(75) Inventors: Mike Folgner, San Francisco, CA (US); Ryan Cunningham, San Francisco, CA (US); Chris Kalaboukis, San Jose, CA (US)

(73) Assignee: OATH INC., New York, NY (US)

( * ) Notice: Subject to any disclaimer, the term of this patent is extended or adjusted under 35 U.S.C. 154(b) by 824 days.

(21) Appl. No.: 12/533,684

(22) Filed: Jul. 31, 2009

(65) Prior Publication Data
US 2011/0029512 A1    Feb. 3, 2011

(51) Int. Cl.
*G06F 17/30*     (2006.01)
*G06Q 50/00*     (2012.01)

(52) U.S. Cl.
CPC ....... *G06F 17/30887* (2013.01); *G06Q 50/01* (2013.01)

(58) Field of Classification Search
CPC ...................................... G06Q 50/01
USPC ........................................... 705/319
See application file for complete search history.

(56) References Cited

U.S. PATENT DOCUMENTS

| | | | |
|---|---|---|---|
| 5,907,836 A | 5/1999 | Sumita et al. | |
| 7,519,658 B1 * | 4/2009 | Anglin et al. | 709/203 |
| 8,055,664 B2 * | 11/2011 | Baluja et al. | 707/749 |
| 8,196,168 B1 * | 6/2012 | Bryan | G11B 27/002 725/134 |
| 8,555,177 B1 * | 10/2013 | Junee | H04L 65/403 715/719 |
| 2005/0004985 A1 * | 1/2005 | Stochosky | H04L 12/1813 709/205 |
| 2005/0021624 A1 * | 1/2005 | Herf | H04L 12/1822 709/204 |
| 2006/0156335 A1 | 7/2006 | Asazu et al. | |

(Continued)

FOREIGN PATENT DOCUMENTS

JP    2008077227    4/2008
JP    2008278088    11/2008

(Continued)

OTHER PUBLICATIONS

Search Report and Written Opinion received for International Application No. PCT/US2010/042069 dated Feb. 25, 2011, 9 pages.

(Continued)

*Primary Examiner* — Tamara Griffin
(74) *Attorney, Agent, or Firm* — James J. DeCarlo; Greenberg Traurig, LLP

(57) ABSTRACT

Techniques are described herein that are capable of providing a link to a portion of a media object (e.g., video, audio, etc.) in real time in a social networking update. For example, a user in a social networking system may generate a social networking update that references a media object while the user is consuming the media object. A determination may be made that the user is consuming the media object and that the user generates the social networking update while the user is consuming the media object. A link is inserted in the social networking update that references a portion of the media object that corresponds to a time instance at which the user generates the social networking update. For instance, the link may be automatically inserted in the social networking update.

14 Claims, 15 Drawing Sheets

(56) References Cited

U.S. PATENT DOCUMENTS

| | | | |
|---|---|---|---|
| 2007/0255807 A1 | 11/2007 | Hayashi et al. | |
| 2008/0040673 A1* | 2/2008 | Zuckerberg et al. | 715/745 |
| 2008/0065997 A1* | 3/2008 | Szeto | G06Q 10/107 |
| | | | 715/753 |
| 2008/0154951 A1* | 6/2008 | Martinez | G06Q 30/02 |
| 2008/0195657 A1 | 8/2008 | Naaman et al. | |
| 2008/0240671 A1 | 10/2008 | Yamasaki et al. | |
| 2009/0049118 A1* | 2/2009 | Stevens | G06F 17/30017 |
| | | | 709/203 |
| 2009/0150388 A1* | 6/2009 | Roseman | G06F 17/278 |
| 2009/0150786 A1 | 6/2009 | Brown | |
| 2009/0164569 A1 | 6/2009 | Garcia et al. | |
| 2009/0287790 A1* | 11/2009 | Upton | H04L 12/1827 |
| | | | 709/208 |
| 2010/0042910 A1* | 2/2010 | Manolescu | G06F 17/241 |
| | | | 715/202 |
| 2011/0137920 A1* | 6/2011 | Cohen | G06O 10/04 |
| | | | 707/748 |

FOREIGN PATENT DOCUMENTS

| | | | | |
|---|---|---|---|---|
| KR | 100721409 B1 * | 5/2007 | | G06F 17/30817 |
| WO | 2011/014365 A3 | 2/2011 | | |
| WO | 2011014365 A2 | 2/2011 | | |

OTHER PUBLICATIONS

Noyes, Donald et al.; "Automatic Link Generation," 2 pages (2008).
Supplementary European Search Report dated Sep. 14, 2016, 8 pages.

* cited by examiner

PROVIDING LINK TO PORTION OF MEDIA OBJECT IN REAL TIME IN SOCIAL NETWORKING UPDATE

BACKGROUND OF THE INVENTION

Field of the Invention

The present invention generally relates to social networking. In particular, the present invention is related to providing a link to a portion of a media object in real time in a social networking update.

Background

Social networking systems, including social networks and "socialized" portal web sites, such as those hosted by Yahoo! Inc., Microsoft Corporation, and Google Inc., enable users to broadcast social networking updates (e.g., messages regarding the users, the users' observations, etc.) to other users who subscribe to their updates. Facebook®, MySpace®, Twitter®, and LinkedIn® are some examples of social networks. Example socialized portal web sites include movies.yahoo.com, video.yahoo.com, music.msn.com, www.bing.com/videos, www.youtube.com, etc. Users who provide social networking updates may be referred to as posters. Users who subscribe to updates of a poster may be referred to as followers of that poster. Posters may provide social networking updates to their followers via email, short message service (SMS), instant message (IM), or any other suitable messaging technology.

Posters often provide social networking updates that refer to media objects (e.g., video, audio, etc.) that the posters are consuming (e.g., watching, listening to, etc.). The media objects may be live or recorded. If a media object is recorded, a poster may explicitly provide a link to the media object in a social networking update. Alternatively, the poster may provide a sufficient description in the social networking update to enable followers to find the media object that is referenced in the social networking update. Although the poster may include text in the social networking update that describes a portion of the media object to which the poster wishes to direct the followers' attention, the followers may have difficulty finding the described portion. For instance, the followers may not be able to find the portion of the media object that is described by the text.

If a media object is live, a poster may explicitly provide a link to the media object in a social networking update, but followers may not receive or read the social networking update promptly enough to consume a portion of the live media object to which the poster wishes to direct the followers' attention. Accordingly, the followers may thereafter attempt to access a recorded version of the media object. However, a recorded version of the media object may not be accessible until completion of the live performance. In fact, the link to the live media object in the social networking update may not be accessible until completion of the live performance.

Thus, systems, methods, and computer program products are needed that are capable of providing a link to a portion of a media object in real time in a social networking update.

BRIEF SUMMARY OF THE INVENTION

Various approaches are described herein for, among other things, providing a link to a portion of a media object in real time in a social networking update. By "real time", it is meant that the link is provided in the social networking update while a user who generates the social networking update is consuming the media object. For instance, the link may be provided while the user is consuming the media object live, on demand, in a delayed broadcast, or in another context.

A media object may be a video recording, an audio recording, a stream of text, a slide cast, or any other suitable media object. A portion of a media object is defined herein to be less than the entire media object. For example, the link may direct a user to a file that includes less than the entire media object. In another example, the link may direct the user to a time offset within a file that includes the entire media object, such that the time offset defines a starting time for consumption of the portion. In accordance with this example, accessing the link does not initiate consumption of the entire media object. Rather, accessing the link initiates consumption of the portion of the media object that is defined by the time offset. In yet another example, the link may direct the user to a time offset within a file that includes less than the entire media object, such that the time offset defines a starting time for consumption of the portion. In accordance with this example, accessing the link does not initiate consumption of the entire file. Rather accessing the link initiates consumption of the portion of the file that is defined by the time offset.

By providing a link to a portion of a media object in a social networking update, an example embodiment can advantageously enable a follower of a user who generates the social networking update to access the portion of the media object without having to find the portion in the media object based on a description provided by the user. In another example embodiment, providing a link to a portion of a media object that is live may enable a follower of the user to consume the portion of the media object before completion of the live performance.

By automatically inserting a link to a portion of a media object in a social networking update, an example embodiment can advantageously eliminate the need for a user who generates the social networking update to determine a uniform resource identifier (URI), such as a uniform resource locator (URL) or a uniform resource name (URN)), that is associated with the portion of the media object. In another example embodiment, automatically inserting a link to a portion of a media object in a social networking update can advantageously eliminate the need for the user to explicitly enter the URI in the social networking update.

A user in a social networking system may generate a social networking update that references a media object while the user is consuming the media object. An update manager may be configured to determine that the user is consuming the media object and that the user generates the social networking update while the user is consuming the media object. An update manager is a computer (e.g., Web server) or other processing system, including one or more processors, which is configured to manage social networking updates of users in a social networking system. The update manager may be further configured to insert a link in the social networking update that references a portion of the media object that corresponds to a time instance at which the user generates the social networking update. For instance, the update manager may be configured to automatically insert the link in the social networking update.

The update manager may be configured to provide the social networking update including the link to followers of the user. The update manager may be further configured to provide the portion of the media object that is referenced by the link to followers of the user who access the link.

In particular, a method is described in which a social networking update that is provided at a time instance by a user is captured. A textual analysis is performed with respect to the social networking update to determine a media indicator that is included in the social networking update. A media object that corresponds to the media indicator is determined. A portion of the media object that corresponds to the time instance is captured. A link to the portion of the media object that corresponds to the time instance is inserted in the social networking update.

Another method is described in which a determination is made that a user is consuming a media object. A determination is made that the user generates a social networking update that references the media object at a time instance while the user is consuming the media object. A link is automatically inserted in the social networking update. The link references a portion of the media object that corresponds to the time instance.

A system is described that includes an update capture module, an update analysis module, a matching module, a media portion capture module, and a link insertion module. The update capture module is configured to capture a social networking update that is provided at a time instance by a user. The update analysis module is configured to perform a textual analysis with respect to the social networking update to determine a media indicator that is included in the social networking update. The matching module is configured to determine a media object that corresponds to the media indicator. The media portion capture module is configured to capture a portion of the media object that corresponds to the time instance. The link insertion module is configured to insert a link to the portion of the media object that corresponds to the time instance in the social networking update.

Another system is described that includes a media determination module, an update determination module, and a link insertion module. The media determination module is configured to determine that a user is consuming a media object. The update determination module is configured to determine that the user generates a social networking update that references the media object at a time instance while the user is consuming the media object. The link insertion module is configured to automatically insert a link in the social networking update. The link references a portion of the media object that corresponds to the time instance.

Computer program products are also described. For instance, a first computer program product includes a computer-readable medium having computer program logic recorded thereon for enabling a processor-based system to provide a link to a portion of a media object in a social networking update. The computer program logic includes a first program logic module, a second program logic module, a third program logic module, a fourth program logic module, and a fifth program logic module. The first program logic module is for enabling the processor-based system to capture a social networking update that is provided at a time instance by a user. The second program logic module is for enabling the processor-based system to perform a textual analysis with respect to the social networking update to determine a media indicator that is included in the social networking update. The third program logic module is for enabling the processor-based system to determine a media object that corresponds to the media indicator. The fourth program logic module is for enabling the processor-based system to capture a portion of the media object that corresponds to the time instance. The fifth program logic module is for enabling the processor-based system to insert a link to the portion of the media object that corresponds to the time instance in the social networking update.

A second computer program product includes a computer-readable medium having computer program logic recorded thereon for enabling a processor-based system to provide a link to a portion of a media object in a social networking update. The computer program logic includes a first program logic module, a second program logic module, and a third program logic module. The first program logic module is for enabling the processor-based system to determine that a user is consuming a media object. The second program logic module is for enabling the processor-based system to determine that the user generates a social networking update that references the media object at a time instance while the user is consuming the media object. The third program logic module is for enabling the processor-based system to automatically insert a link in the social networking update. The link references a portion of the media object that corresponds to the time instance.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
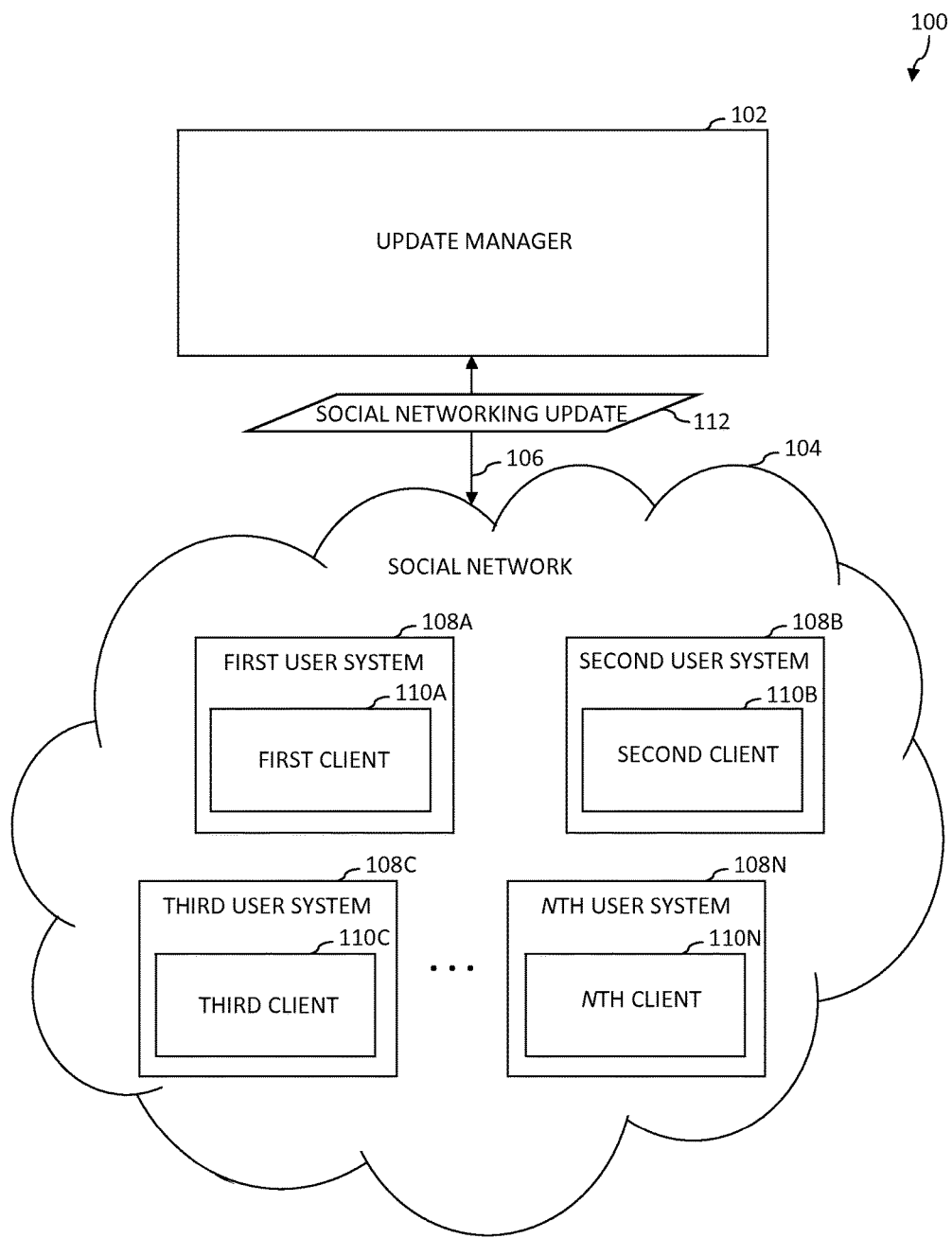
FIG. 1 is a block diagram of an example social networking system in accordance with an embodiment described herein.

FIGS. 5, 7, 9, and 11 are block diagrams of example implementations of an update manager shown in FIG. 1 in accordance with embodiments described herein.

Figure 6:
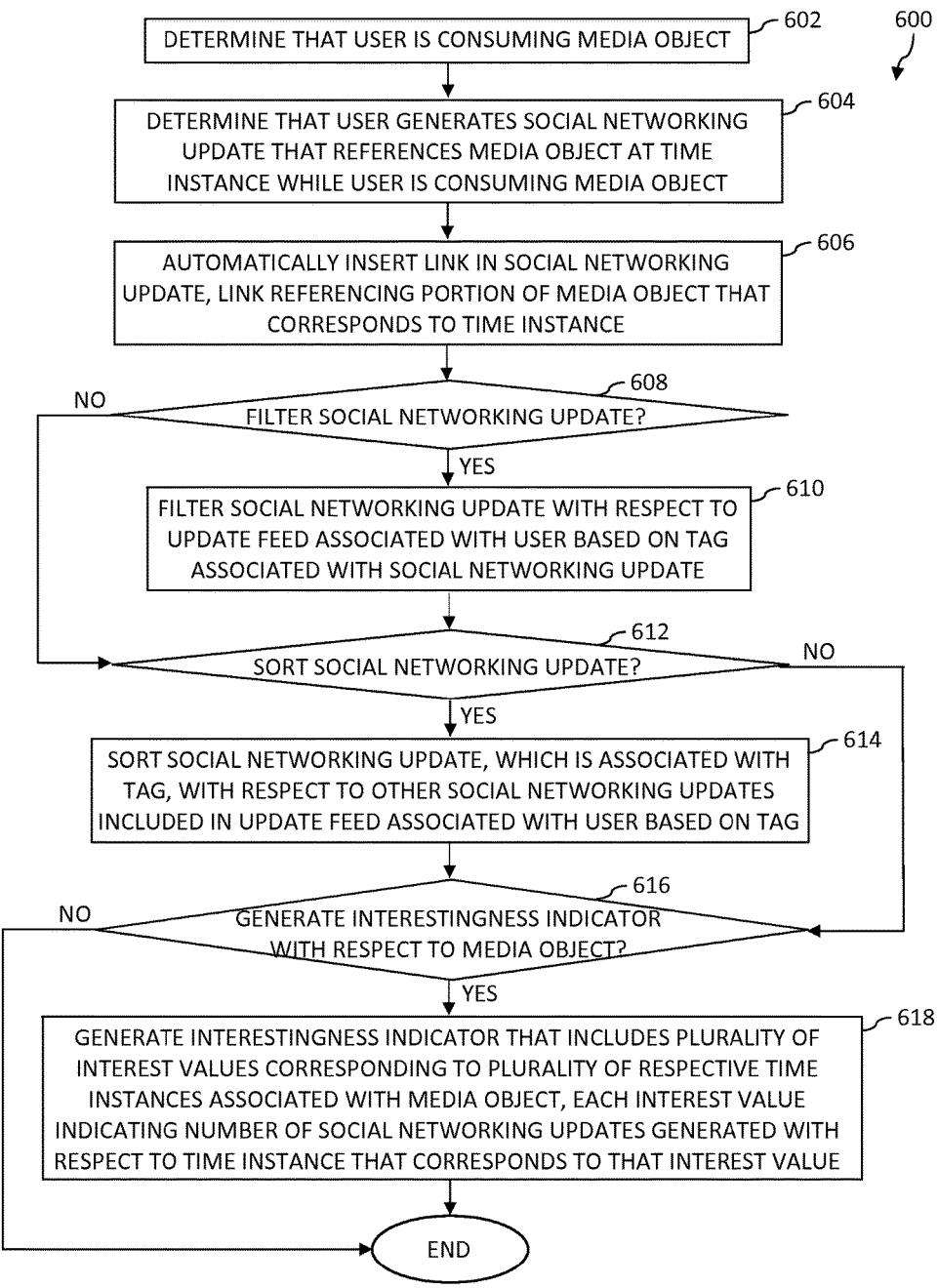
Figure 8:
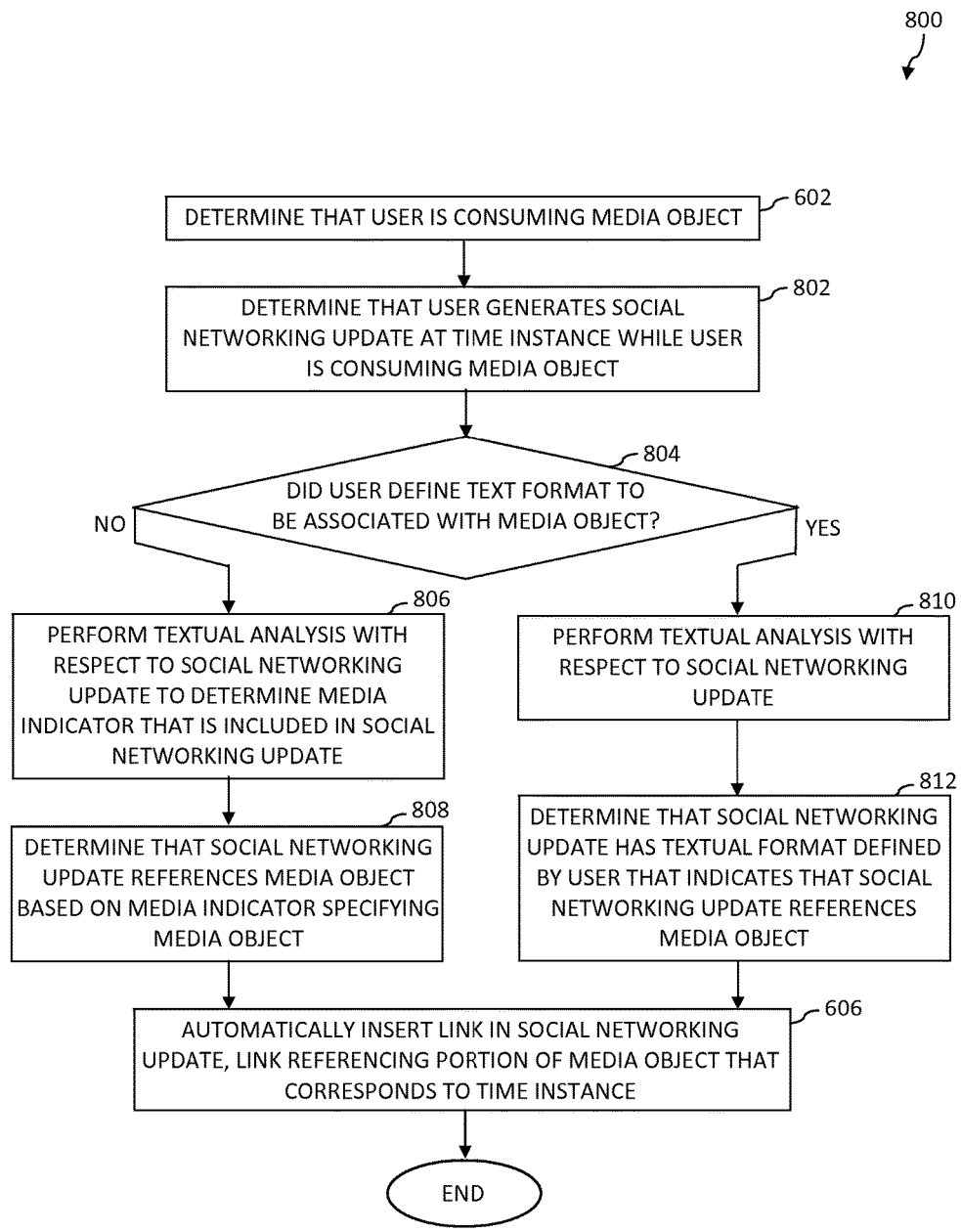
Figure 10:
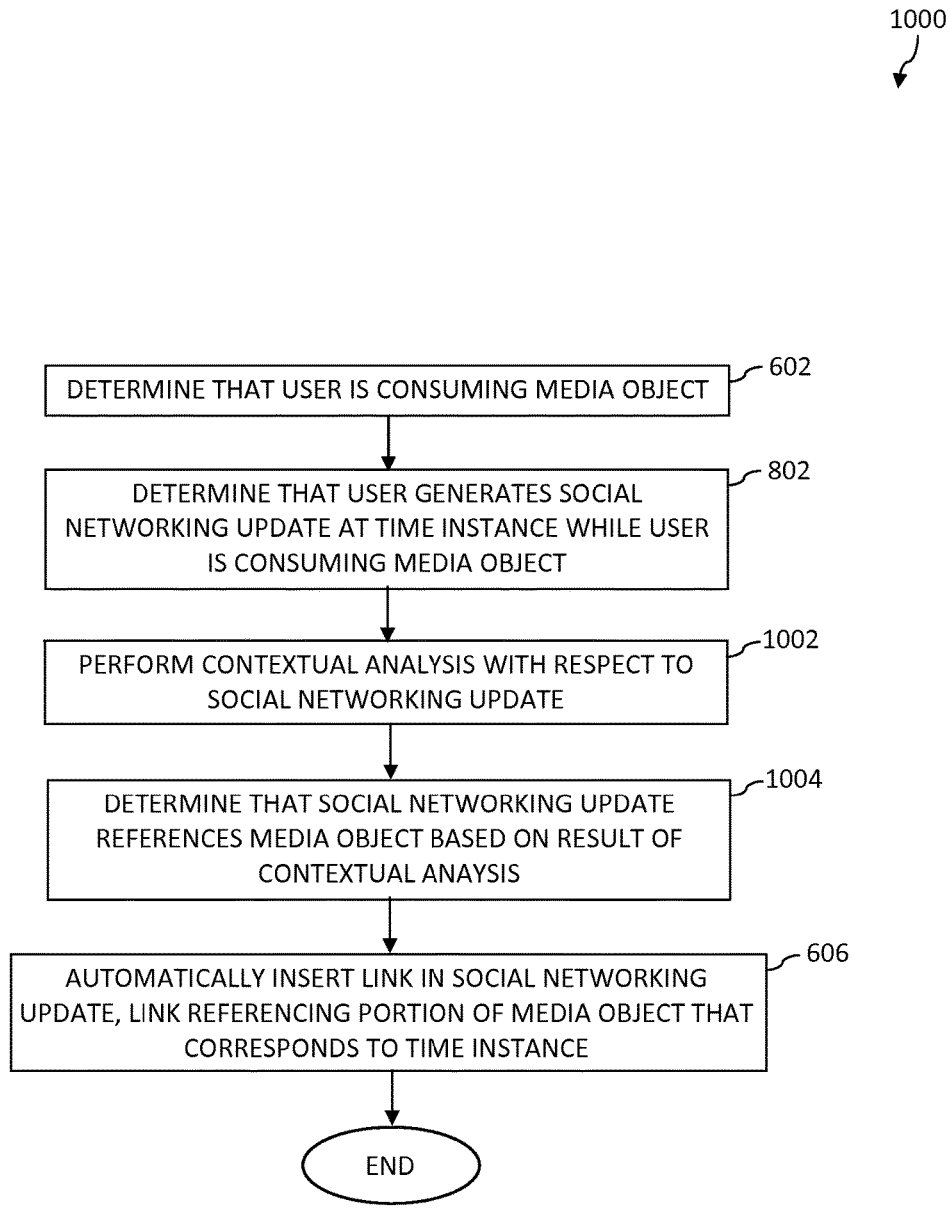

FIGS. 6, 8, and 10 depict flowcharts of methods for providing a link to a portion of a media object in real time in a social networking update in accordance with embodiments described herein.

Figure 12:
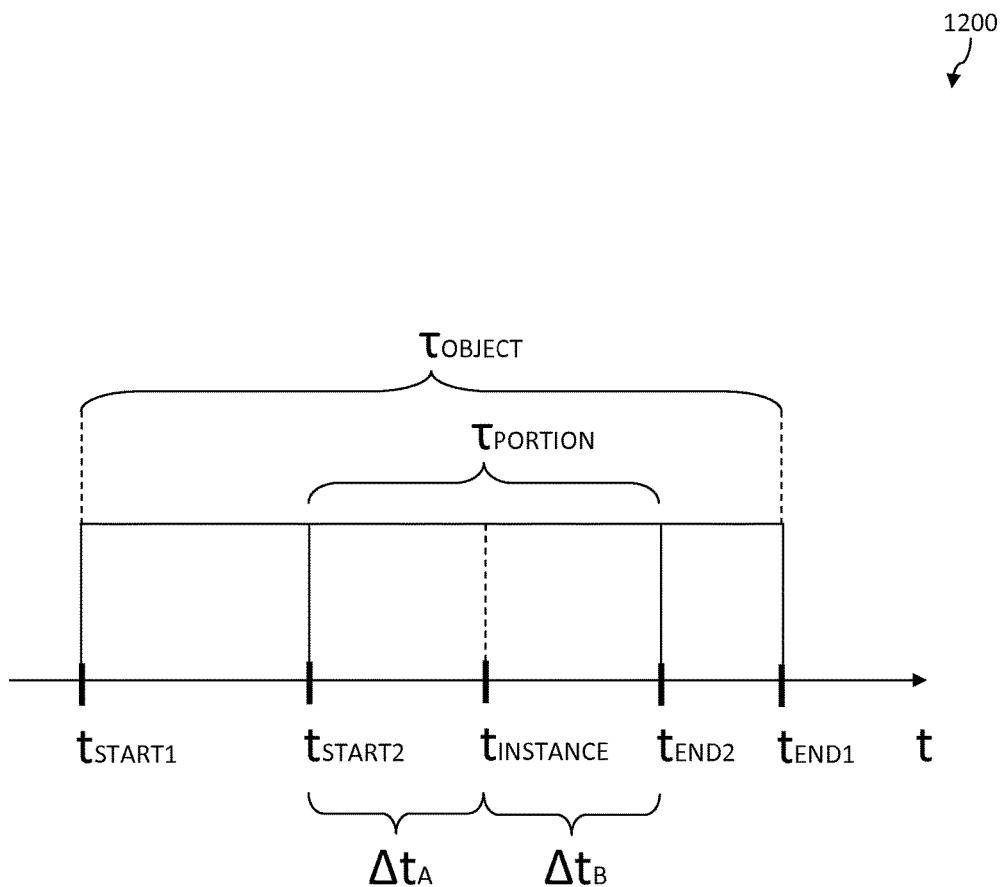

FIG. 12 depicts a time line in accordance with an embodiment described herein.

Figure 13:
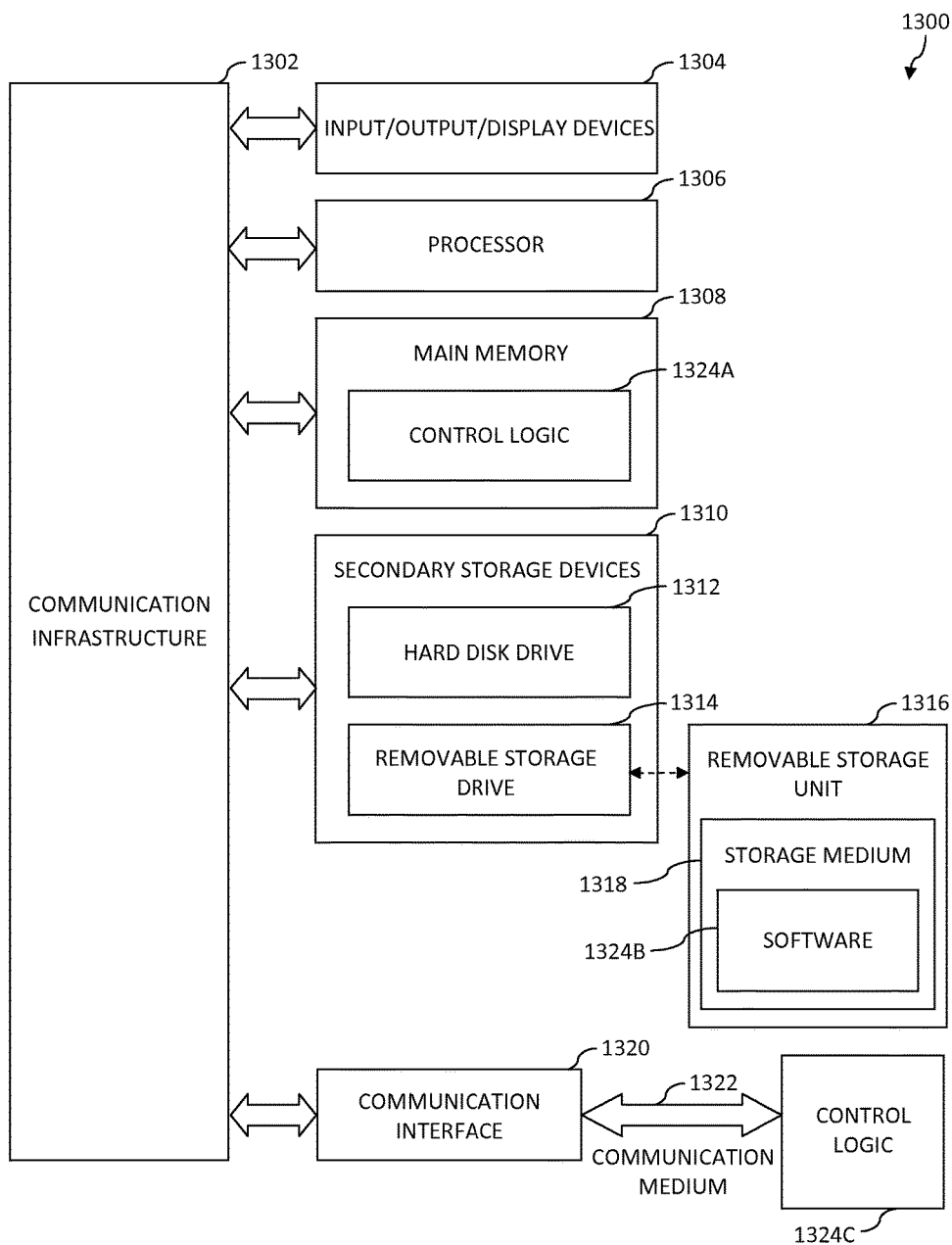

FIG. 13 is a block diagram of a computer that may be used to implement one or more aspects of the present invention.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments for Providing a Link to a Portion of a Media Object in a Social Networking Update Example embodiments are capable of providing a link to a portion of a media object in real time in a social networking update. By "real time", it is meant that the link is provided in the social networking update while a user who generates the social networking update is consuming the media object. For instance, the link may be provided while the user is consuming the media object live, on demand, in a delayed broadcast, or in another context.

A media object may be a video recording, an audio recording, a stream of text, a slide cast, or any other suitable media object. A portion of a media object is defined herein to be less than the entire media object. For example, the link may direct a user to a file that includes less than the entire media object. In another example, the link may direct the user to a time offset within a file that includes the entire media object, such that the time offset defines a starting time for consumption of the portion. In accordance with this example, accessing the link does not initiate consumption of the entire media object. Rather, accessing the link initiates consumption of the portion of the media object that is defined by the time offset. In yet another example, the link may direct the user to a time offset within a file that includes less than the entire media object, such that the time offset defines a starting time for consumption of the portion. In accordance with this example, accessing the link does not initiate consumption of the entire file. Rather accessing the link initiates consumption of the portion of the file that is defined by the time offset.

A user in a social networking system may generate a social networking update that references a media object while the user is consuming the media object. Example embodiments are capable of determining that the user is consuming the media object and that the user generates the social networking update while the user is consuming the media object. Example embodiments insert a link in the social networking update that references a portion of the media object that corresponds to a time instance at which the user generates the social networking update. Some example embodiments automatically insert the link in the social networking update.

The social networking update including the link may be provided to followers of the user. Example embodiments are capable of providing the portion of the media object that is referenced by the link to followers of the user who access the link.

FIG. 1 shows a block diagram of an example social networking system 100 in accordance with an embodiment described herein. As shown in FIG. 1, social networking system 100 includes an update manager 102 and a social network 104. Social network 104 is communicatively connected to update manager 102 by a communication interface 106. Communication among user systems 108A-108N and communications between update manager 102 and any of user systems 108A-108N is performed in accordance with well-known network communication protocols. Each of the elements of system 100 is described in detail below.

Social network 104 is an online social network or a combination of social networks, that includes a community of users (network participating persons) who interact within social network 104 using respective user systems 108A-108N. Each of the user systems 108A-108N is a computer, a personal digital assistant (PDA), or other processing system, including one or more processors, which is configured to enable a user to provide social networking updates to other users in social network 104. For instance, each of the user systems 108A-108N includes a client 110 (e.g., a Web browser), which enables a respective user to provide such updates.

Social network 104 may include any number of user systems 108-108N, including hundreds, thousands, or even millions of user systems 108A-108N. Social network 104 operates within a communication network, such as a local area network (LAN), a wide area network (WAN), or a combination of networks, such as the Internet. For example, social network 104 may be based in the World Wide Web. The communication network enables communication between user systems 108A-108N. Social network 104 may enable one or more ways for users to interact, including enabling communications between user systems 108A-108N through one or more of blogging, discussion groups, email, file sharing, instant messaging, online chat, tweeting, video, voice chat, and/or other user communication mechanisms.

Update manager 102 is a computer (e.g., Web server) or other processing system, including one or more processors, which is configured to manage social networking updates of users in social networking system 100. When a user generates a social networking update (e.g., social networking update 112) using a client 110, for example, the social networking update is provided to update manager 102 via communication interface 106, as shown in FIG. 1. Update manager 102 determines whether operation(s) are to be performed with respect to the social networking update before forwarding the social networking update via communication interface 106 to followers of the user.

One such operation that may be performed by update manager 102 is inserting a link in a social networking update that corresponds to a portion of a media object that a user was consuming when the user generated the social networking update. For instance, update manager 102 may be configured to automatically insert the link in the social networking update. Techniques for providing a link to a portion of a media object in a social networking update are discussed in further detail below with reference to FIGS. 4A-4C and 5-12.

When update manager 102 forwards a social networking update of a user to a follower of the user, update manager 102 may add the social networking update to an update stream that is associated with the user. For instance, update manager 102 may add the social networking updates of the user in chronological order or other order. The update stream of the user (or designated social networking update(s) therein) may be displayed as a Web page or in other form by any one or more of the clients 110A-110N. For instance, the user's update stream may be displayed on the user's profile or home page or on a news feed page or other type of page of a follower.

Upon receiving a social networking update that includes a link to a portion of a media object from update manager 102, a follower may choose to access the link. For instance, the follower may click on the link, so that the follower is directed to the portion of the media object that is referenced by the link. In accordance with an embodiment, accessing the link causes an access indicator to be provided to update manager 102. For instance, the follower's client 110 may generate the access indicator. Update manager 102 may be configured to provide the portion of the media object to the follower in response to receiving the access indicator.

Social networking system 100 is shown in FIG. 1 to include a single social network 104 for illustrative purposes and is not intended to be limiting. Persons skilled in the relevant art(s) will recognize that social networking system 100 may include any one or more social network(s) and/or socialized portal web sites.

Figure 2:
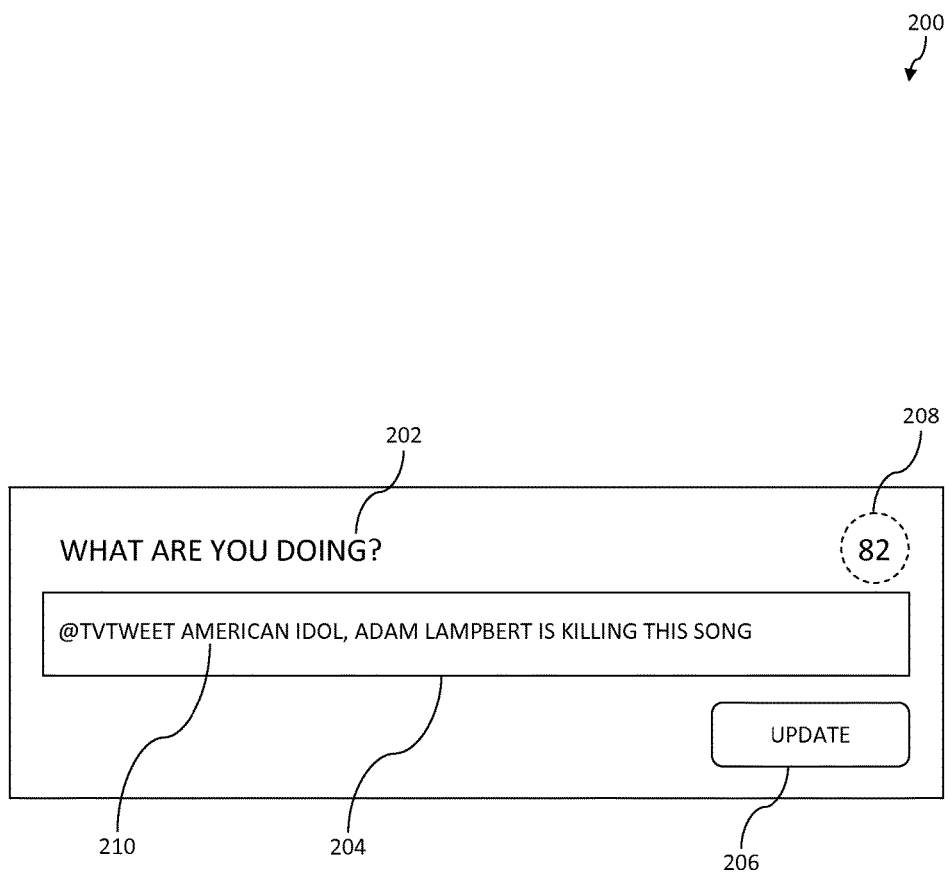
FIGS. 2 and 3 are illustrations of respective example interface elements that may be used by a user to provide social networking updates in a social networking system in accordance with embodiments described herein.
Figure 3:
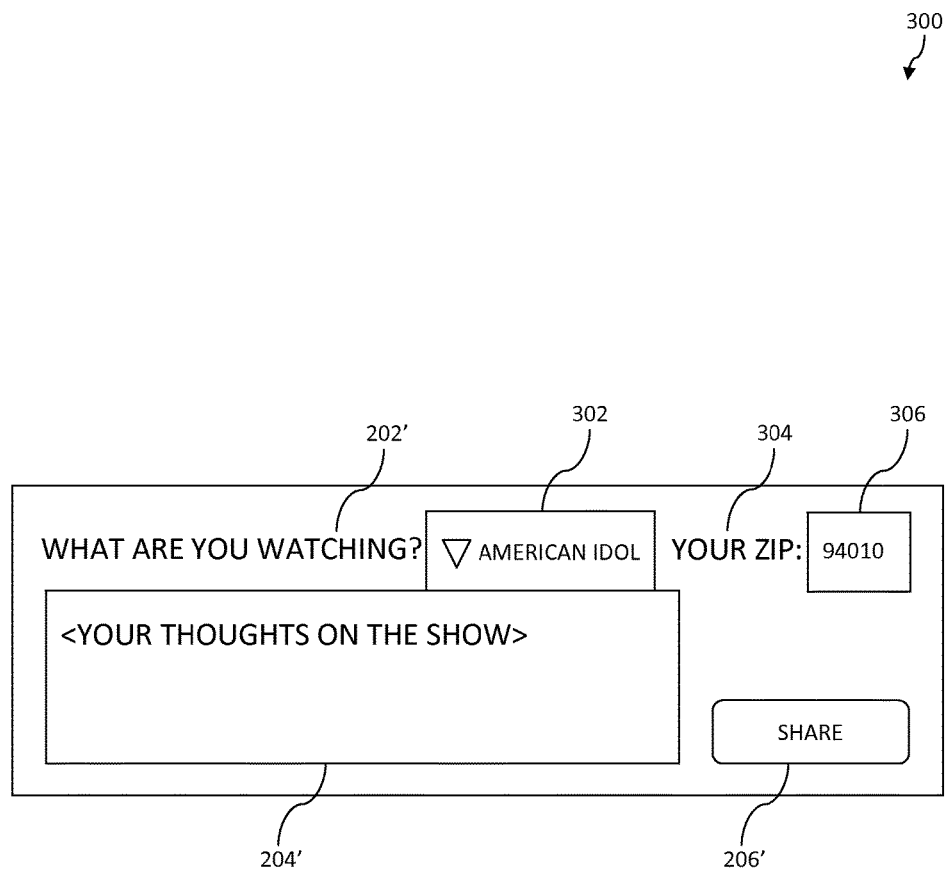

FIGS. 2 and 3 are illustrations of respective example interface elements 200 and 300 that may be used by a user to provide social networking updates in a social networking system (e.g., social networking system 100) in accordance with embodiments described herein. Interface elements 200 and 300 may be displayed by a user system (e.g., any of user systems 108A-108N) via a respective client (e.g., any of clients 110A-110N) in accordance with information received from an update manager (e.g., update manager 102), for example.

As shown in FIG. 2, interface element 200 includes an inquiry 202, an update window 204, an update button 206, and a character counter 208. Inquiry 202 is a textual message that asks the user, "What are you doing?" Update window 204 displays text 210 that is entered by the user for inclusion in a social networking update. Selection of update button 206 generates a social networking update that includes the text 210 that is shown in update window 204. Character counter 208 indicates the number of characters that may be added to the example text 210 that is shown in update window 204. For instance, a maximum number of characters may be specified with respect to social networking updates, though the scope of the example embodiments is not limited in this respect. In an example implementation, the maximum number of characters that may be included in a social networking update is 140. The example text 210 shown in update window 204 constitutes fifty-eight characters. In accordance with this example implementation, character counter 208 shows that 140−58=82 characters may be added to the example text 210 shown in update window 204. It will be recognized that character counter 210 may indicate the number of characters that are included in the example text 210 in addition to (or in lieu of) the number of characters that may be added to the example text 210.

The example text 210 shown in window 204 recites, "@TVtweet American Idol, Adam Lampbert is killing this song" for illustrative purposes and is not intended to be limiting. It will be recognized that the user may enter any suitable text in update window 204, up to any maximum number of characters that may be imposed. A maximum number of characters need not necessarily be imposed with respect to update window 204. In the example text 210, the phrase "@TVtweet American Idol" may constitute a media indicator that specifies an American Idol television show, for example. The update manager may use this media indicator to determine that the user is referring to the American Idol television show in a social networking update that is generated in response to the user selecting update button 206. The format of the media indicator may be a default format or a format that is defined by the user. In accordance with example embodiments described herein, the update manager may incorporate a link to a portion of the American Idol television show that corresponds to a time instance at which the user selected update button 206 in the social networking update, along with the text "Adam Lampbert is killing this song."

It will be recognized that interface element 200 may not include one or more of inquiry 202, update window 204, update button 206, and/or character counter 208. Furthermore, interface element 200 may include features in addition to or in lieu of inquiry 202, update window 204, update button 206, and/or character counter 208.

As shown in FIG. 3, interface element 300 includes an inquiry 202', an update window 204', a share button 206', a media selector 302, a textual message 304, and a zip code window 306. In this document, whenever a prime is used to modify a reference number, the modified reference number indicates an example (or alternate) implementation of the element that corresponds to the reference number. For instance, inquiry 202' of FIG. 3 is an alternate implementation of inquiry 202 of FIG. 2.

Inquiry 202' is a textual message that asks the user, "What are you watching?" Update window 204' displays text that is entered by the user for inclusion in a social networking update. Update window 204 is shown to include a phrase "<Your thoughts on the show>" for illustrative purposes to prompt the user to type the user's thoughts in update window 204'. Selection of share button 206' generates a social networking update that includes any text that the user has entered in update window 204', up to any maximum number of characters that may be imposed. A maximum number of characters need not necessarily be imposed with respect to update window 204'.

Media selector 302 enables the user to select a television show that the user is watching from a plurality of predetermined television shows. It will be recognized that media selector 302 is shown to enable selection from among television shows for illustrative purposes and is not intended to be limiting. For instance, media selector 302 may enable the user to select among a plurality of television channels, online music channels, online video channels, any other suitable media sources, or a combination thereof. Moreover, media selector 302 is shown to be implemented as a drop-down menu for illustrative purposes and is not intended to be limiting. For instance, media selector 302 may be implemented as pop-up, drop-down, or equivalent menu, or other graphical interface element to enable the user to select among media sources.

Textual message 304 indicates that the user is to enter the user's zip code in zip code window 306. Zip code window 306 displays text that is entered by the user for indicating the zip code of the user. The zip code of the user may provide context with respect to a social networking update that is generated in response to the user selecting share button 206'. An update manager may perform a contextual analysis with respect to the social networking update to determine a media object or portion thereof that is being consumed by the user. For instance, association of the user's zip code with the social networking update may enable the update manager to determine that the social networking update references a media object.

In an example implementation of an update manager (e.g., update manager 102), the update manager may use the zip code of the user to determine a media object that is being consumed by the user. For example, a media provider may provide different media objects to users in different zip codes at a given time. The update manager may be capable of distinguishing between the different media objects based on the zip code of the user.

In another example implementation of an update manager, the update manager may use the zip code of the user to determine a portion of a media object that is being consumed by the user. For example, a media provider may provide a media object to users in different zip codes at different respective times, though the times at which the media objects are provided may overlap. For instance, a media object that is scheduled to last for multiple hours may be provided to users in a first time zone one hour later than users in a second time zone. In accordance with this example, different portions of the same media object may be provided to users in different time zones at a given time. The update manager may be configured to distinguish between the different portions of the media object based on the zip code of the user.

In yet another example implementation of an update manager, the update manager may use the zip code to determine other social networking updates that correspond to the zip code. For example, the update manager may use the social networking updates that correspond to the zip code to determine a collective (e.g., average) sentiment of the users corresponding to the zip code. In another example, the update manager may use the social networking updates that correspond to the zip code to determine a variety of sentiments of the users corresponding to the zip code. For instance, the update manager may determine a proportion of the users who are associated with each respective sentiment.

Textual message 304 and window 306 are described with respect to a zip code for illustrative purposes and are not intended to be limiting. It will be recognized that textual message 304 and window 306 may be implemented with respect to any geographical designation, including but not limited to a city, a state, a country, a time zone, a telephone area code, a telephone number prefix, a province, or any other suitable geographical designation. It will also be recognized that textual message 304 and window 306 may be implemented with respect to any other contextual information in addition to or in lieu of a geographical designation. For instance, textual message 304 and window 306 may be implemented with respect to a time, a date, or any other suitable contextual information.

It will be recognized that interface element 300 may not include one or more of inquiry 202', update window 204', share button 206', media selector 302, textual message 304, and/or zip code window 306. Furthermore, interface element 300 may include features in addition to or in lieu of inquiry 202', update window 204', share button 206', media selector 302, textual message 304, and/or zip code window 306.

Figure 4A:
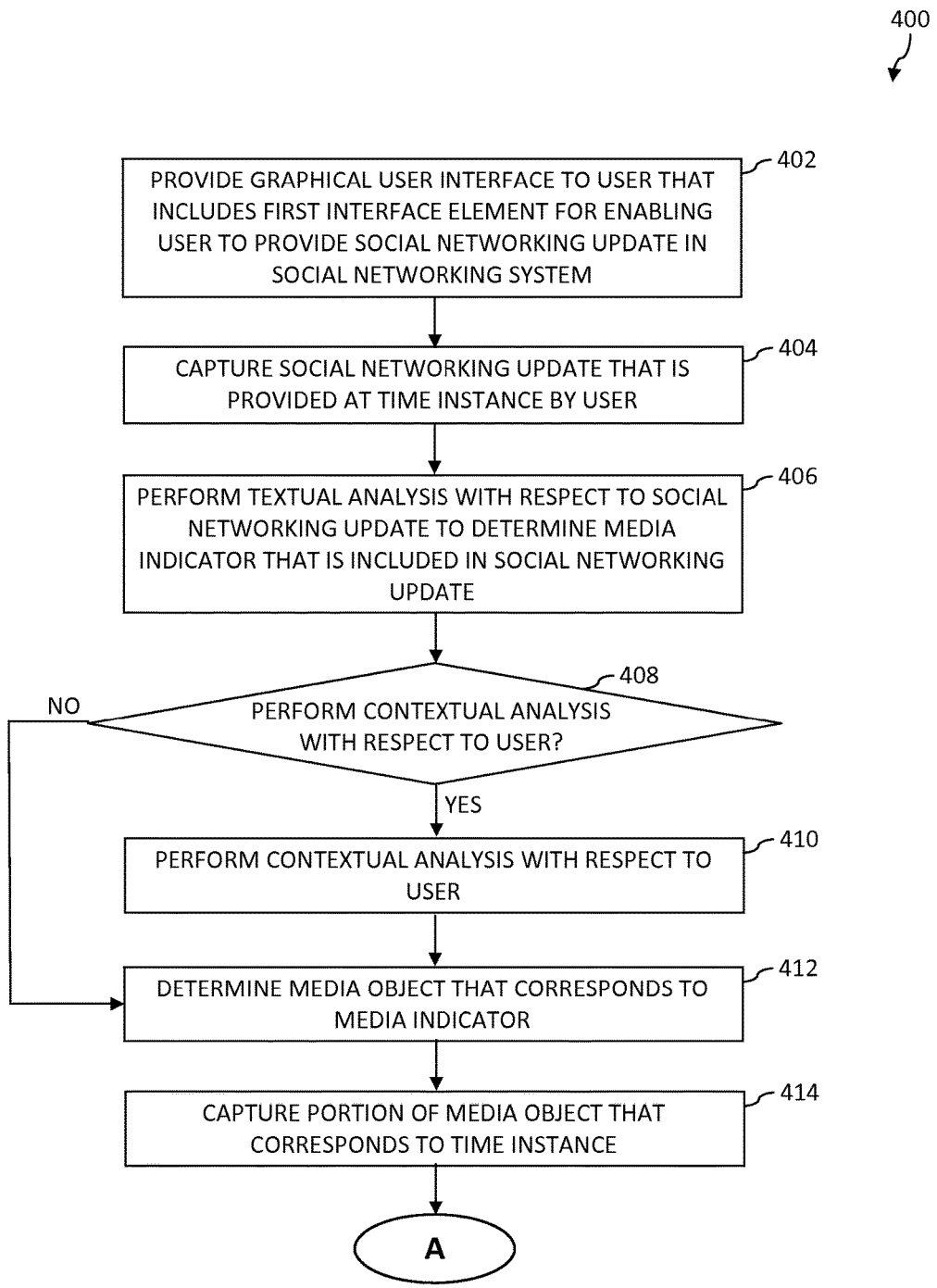
FIGS. 4A-4C depict respective portions of a flowchart of a method for providing a link to a portion of a media object in real time in a social networking update in accordance with an embodiment described herein.
Figure 4B:
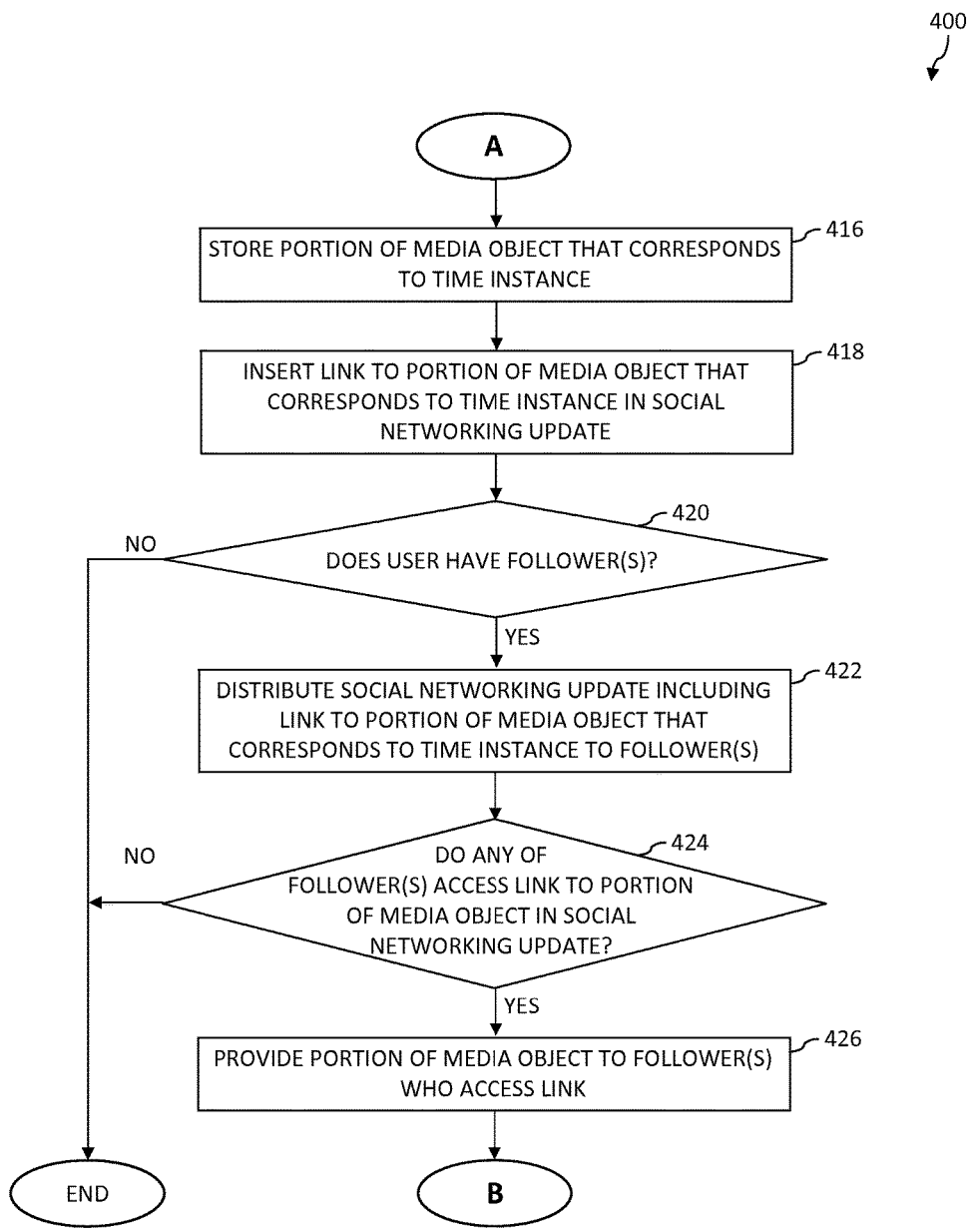
Figure 4C:
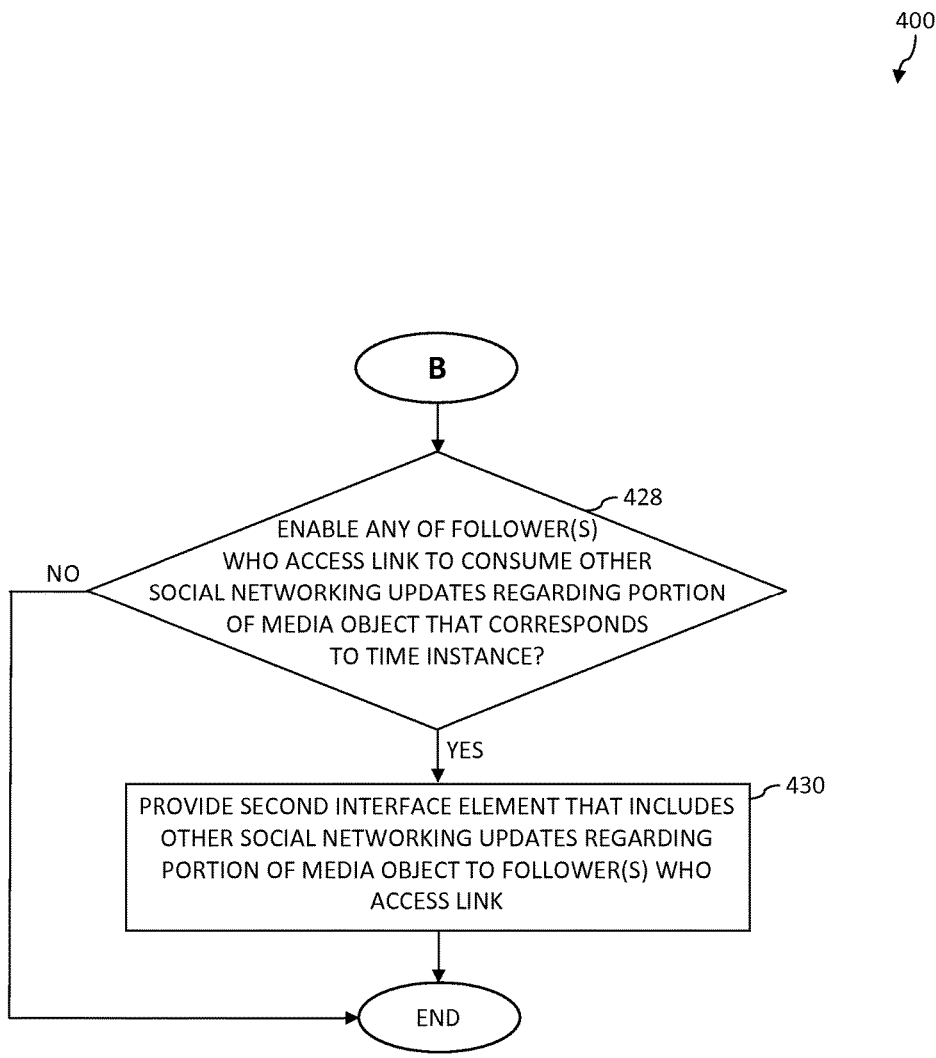

FIGS. 4A-4C depict respective portions of a flowchart 400 of a method for providing a link to a portion of a media object in real time in a social networking update in accordance with an embodiment described herein. Flowchart 400 is described from the perspective of an update manager.

Figure 5:
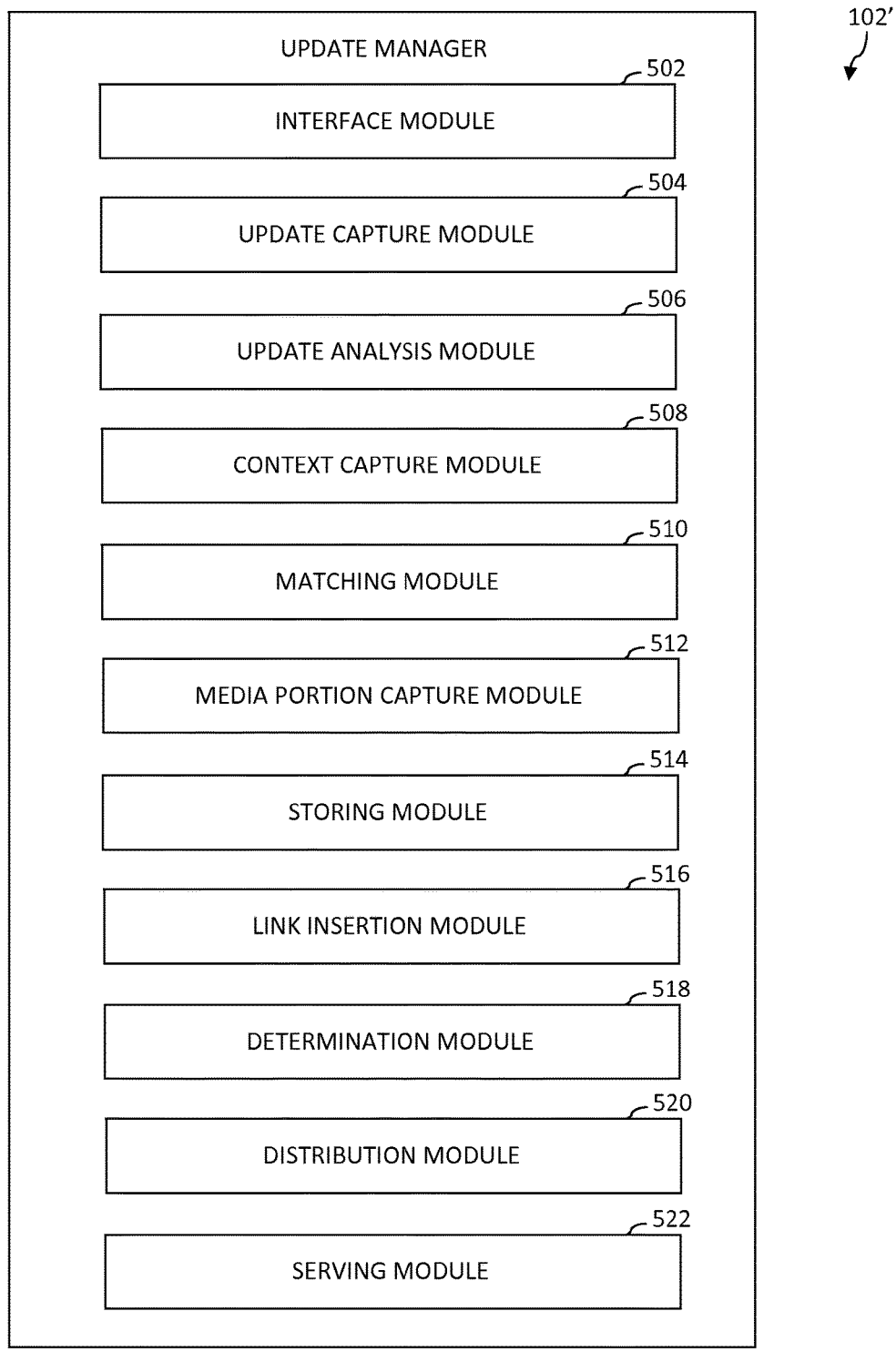

Flowchart 400 may be performed by update manager 102 of online system 100 shown in FIG. 1, for example. For illustrative purposes, flowchart 400 is described with respect to an update manager 102' shown in FIG. 5, which is an example of an update manager 102, according to an embodiment. As shown in FIG. 5, update manager 102' includes an interface module 502, an update capture module 504, an update analysis module 506, a context capture module 508, a matching module 510, a media portion capture module 512, a storing module 514, a link insertion module 516, a determination module 518, a distribution module 520, and a serving module 522. Further structural and operational embodiments will be apparent to persons skilled in the relevant art(s) based on the discussion regarding flowchart 400. Flowchart 400 is described as follows.

As shown in FIG. 4A, the method of flowchart 400 begins at step 402. In step 402, a graphical user interface is provided to a user. The graphical user interface includes a first interface element for enabling a user to provide a social networking update in a social networking system. For example, the first interface element may include interface element 200 of FIG. 2 or interface element 300 of FIG. 3. In an example implementation, interface module 502 provides the graphical user interface.

At step 404, a social networking update that is provided at a time instance by the user is captured. For example, capturing the social networking update may include determining an update indicator that specifies the social networking update. In another example, capturing the social networking update may include parsing an update feed that is associated with the user to obtain the social networking update. In yet another example, capturing the social networking update may include time stamping the social networking update. In an example implementation, update capture module 504 captures the social networking update.

At step 406, a textual analysis is performed with respect to the social networking update to determine a media indicator that is included in the social networking update. A textual analysis may utilize any one or more textual analysis techniques, including but not limited to exact matching, regular expression matching, relevancy matching, etc. In some example embodiments, a textual analysis is capable of determining and/or correcting spelling errors with respect to text that is included in the social networking update. For instance, a plurality of media indicators may be compared to text that is included in the social networking update to determine that the media indicator is included in the text of the social networking update. For example, the media indicator may include a designated combination of textual characters. In an example implementation, update analysis module 506 performs the textual analysis with respect to the social networking update.

At step 408, a determination is made whether a contextual analysis is to be performed with respect to the user. In an example implementation, determination module 518 determines whether the contextual analysis is to be performed with respect to the user. If the contextual analysis is to be performed, flow continues to step 410. Otherwise, flow continues to step 412.

At step 410, the contextual analysis is performed with respect to the user. The contextual analysis may include determining a geographical location of the user, determining a time and/or a date at which the user generated the social networking update, etc. In an example implementation, context capture module 508 performs the contextual analysis.

At step 412, a media object that corresponds to the media indicator is determined. In an example implementation, matching module 510 determines the media object that corresponds to the media indicator. For instance, matching module 510 may review a plurality of indicators that correspond to a plurality of respective media objects to determine the media object that corresponds to the media indicator that is included in the social networking update. For example, a database may store cross references between the plurality of indicators and the plurality of respective media objects. In accordance with this example, matching module 510 may review the cross references to determine the media object that corresponds to the media indicator that is included in the social networking update. Matching module 510 may use a time stamp associated with the social networking update and/or a time stamp associated with the media object to determine the media object that corresponds to the media indicator.

At step 414, a portion of the media object that corresponds to the time instance is captured. For example, capturing the portion of the media object may include determining a portion indicator that specifies the portion of the media object. In another example, capturing the portion of the media object may include parsing the media object to obtain the portion of the media object. In yet another example, capturing the portion of the media object may include time stamping the portion of the media object.

In an example implementation, media portion capture module 512 captures the portion of the media object that corresponds to the time instance. In some example embodiments, media portion capture module 512 encodes the portion of the media object for consumption via the World Wide Web (WWW). For example, media portion capture module 512 may be a set top box that executes a program for capturing the portion of the media object. In accordance with this example, the set top box may be configured to provide the portion of the media object to a computer (e.g., a server), where the portion of the media object may be accessed for subsequent operations.

In some example embodiments, the portion of the media object may be captured in substantially real-time when the user generates the social networking update. For example, the portion of the media object may include previously captured parts of the media object. In accordance with this example, references to the previously captured parts of the media object may be used to capture the portion. In some example embodiments, the portion of the media object may be captured "out-of-band" (i.e., at a time other than when the user generates the social networking update).

Upon completion of step 414, flow continues to step 416, which is shown in FIG. 4B. At step 416, the portion of the media object that corresponds to the time instance is stored. In an example implementation, storing module 514 stores the portion of the media object. Storing module 514 may be a database or any other suitable type of memory storage.

At step 418, a link to the portion of the media object that corresponds to the time instance is inserted in the social networking update. For instance, the link may be automatically inserted in the social networking update. In an example implementation, link insertion module 516 inserts the link that corresponds to the time instance in the social networking update.

In accordance with some example embodiments, the link is represented as an alias of a uniform resource indicator (URI), such as a uniform resource locator (URL) or a uniform resource name (URN), that corresponds to the portion of the media object. For instance, a redirect service (e.g., TinyURL.com) may correlate the alias with the URI that corresponds to the portion of the media object. The link may be represented as an abbreviated URI, such as a TinyURL, for example. Even if the link is represented as an alias, the link may include sufficient parameters to enable a variety of devices (e.g., Web-enabled devices, non-Web-enabled devices, etc.) to interpret the link.

The link may be a "forward link", though the scope of the example embodiments is not limited in this respect. A forward link is defined herein to be a link that refers to a portion of a media object that is not yet available for consumption. In an example implementation, the media object is an American Idol television show, and the portion of the media object is a scene from the American Idol television show. If the scene is not yet available for consumption, a forward link that refers to the scene may be inserted in the social networking update that is generated by the user. The forward link may re-direct anyone (e.g., a follower of the user) who accesses the forward link to the American Idol homepage, for example. Once the scene from the American Idol television show is available for consumption, a media player may be provided to people who access the forward link. The media player may be provided within a graphical user interface via a client. For instance, the media player may be provided on the American Idol homepage. The media player may be synchronized to the start time associated with the scene from the American Idol television show that is referenced in the forward link.

In an example embodiment, the link to the portion of the media object may be immediately inserted in the social networking update upon determination of the media object that corresponds to the user even if the portion of the media object is not available for consumption. For instance, the portion of the media object may be captured subsequently when it becomes available.

At step 420, a determination is made whether the user has follower(s). In an example implementation, determination module 518 determines whether the user has follower(s). If the user has follower(s), flow continues to step 422. Otherwise, flowchart 400 ends.

At step 422, the social networking update including the link to the portion of the media object that corresponds to the time instance is distributed to the follower(s). In an example implementation, distribution module 520 distributes the social networking update including the link to the portion of the media object that corresponds to the time instance to the follower(s).

At step 424, a determination is made whether any of the follower(s) access the link to the portion of the media object in the social networking update. In an example implementation, determination module 518 determines whether any of the follower(s) access the link. If any of the follower(s) access the link, flow continues to step 426. Otherwise, flowchart 400 ends.

At step 426, the portion of the media object is provided to the follower(s) who access the link. In accordance with the example implementation described above in which the user is watching the American Idol television show, the user may be watching the show on cable television, and the show may not be available yet on the Internet. Accordingly, follower(s) may select (e.g., click on) the link to a scene of the show on their television screens to be directed to the portion of the American Idol television show that corresponds to the time instance at which the user generated the social networking update. However, if the follower(s) attempt to access the link on a computer or other communication device via the Internet, the delivery of the portion may be delayed until the portion becomes available on the Internet. If the media object is live, follower(s) who access the link may be given an option to start watching the performance live. In an example implementation, serving module 522 provides the portion of the media object to the follower(s) who access the link.

At step 428, a determination is made whether to enable any of the follower(s) who access the link to consume other social networking updates regarding the portion of the media object that corresponds to the time instance. In an example implementation, determination module 518 determines whether to enable any of the follower(s) who access the link to consume other social networking updates regarding the portion of the media object that corresponds to the time instance. If follower(s) who access the link are to be enabled to consume other social networking updates regarding the portion of the media object, flow continues to step 430. Otherwise, flowchart 400 ends.

At step 430, a second interface that includes other social networking updates regarding the portion of the media object is provided to follower(s) who access the link. In an example implementation, interface module 502 provides the second interface to the follower(s) who access the link.

In some example embodiments, one or more steps 402, 404, 406, 408, 410, 412, 414, 416, 418, 420, 422, 424, 426, 428, and/or 430 of flowchart 400 may not be performed. Moreover, steps in addition to or in lieu of steps 402, 404, 406, 408, 410, 412, 414, 416, 418, 420, 422, 424, 426, 428, and/or 430 may be performed.

It will be recognized that update manager 102' may not include one or more of interface module 502, update capture module 504, update analysis module 506, context capture module 508, matching module 510, media portion capture module 512, storing module 514, link insertion module 516, determination module 518, distribution module 520, and/or serving module 522. Furthermore, update manager 102' may include modules in addition to or in lieu of interface module 502, update capture module 504, update analysis module 506, context capture module 508, matching module 510, media portion capture module 512, storing module 514, link insertion module 516, determination module 518, distribution module 520, and/or serving module 522.

Figure 7:
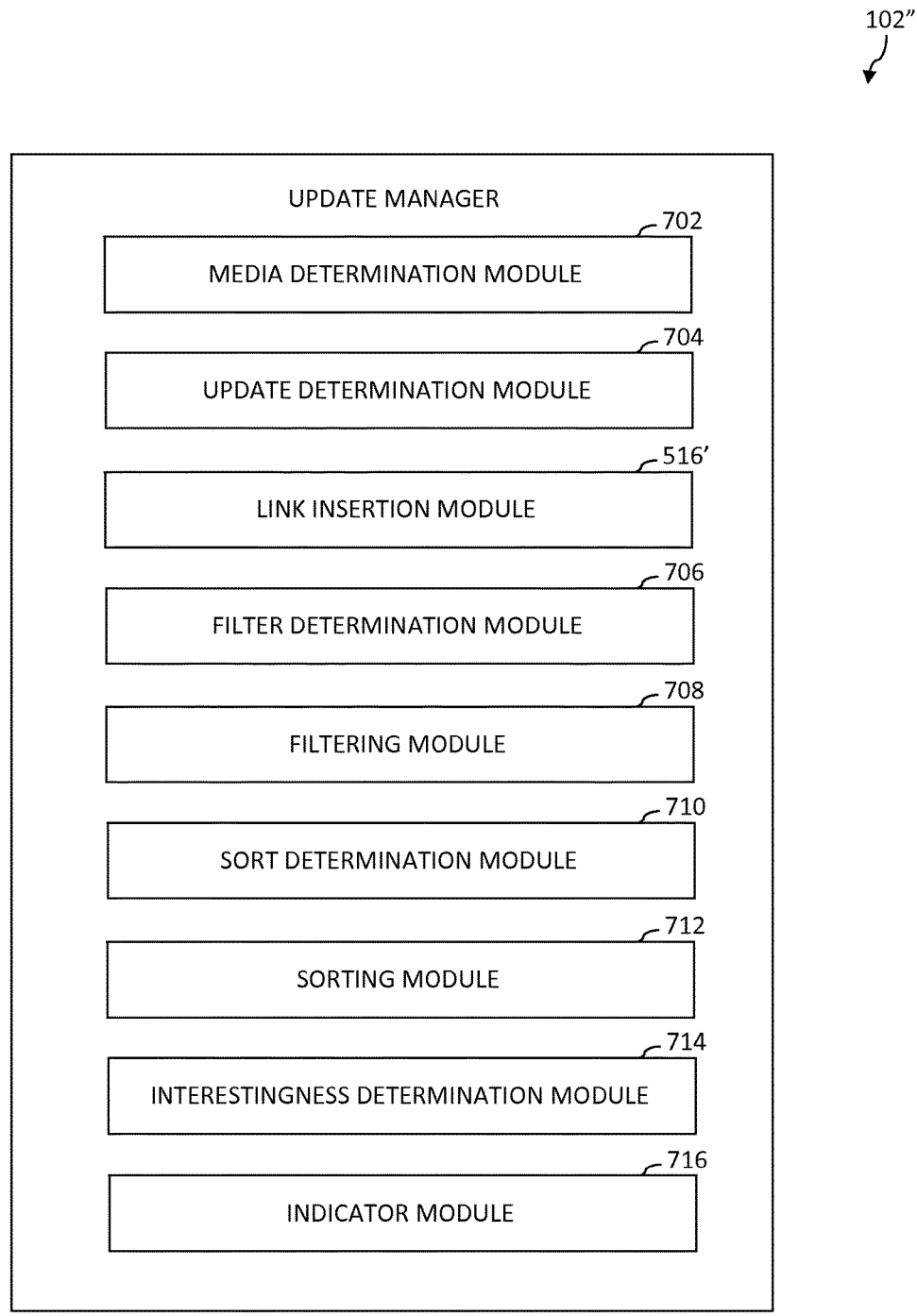

FIG. 6 depicts a flowchart 600 of another method for providing a link to a portion of a media object in real time in a social networking update in accordance with an embodiment described herein. Flowchart 600 is described from the perspective of an update manager. Flowchart 600 may be performed by update manager 102 of online system 100 shown in FIG. 1, for example. For illustrative purposes, flowchart 600 is described with respect to an update manager 102" shown in FIG. 7, which is an example of an update manager 102, according to an embodiment. As shown in FIG. 7, update manager 102" includes a media determination module 702, an update determination module 704, a link insertion module 516', a filter determination module 706, a filtering module 708, a sort determination module 710, a sorting module 712, an interestingness determination module 714, and an indicator module 716. Further structural and operational embodiments will be apparent to persons skilled in the relevant art(s) based on the discussion regarding flowchart 600. Flowchart 600 is described as follows.

As shown in FIG. 6, the method of flowchart 600 begins at step 602. In step 602, a determination is made that a user is consuming a media object. In an example implementation, media determination module 702 determines that the user is consuming the media object.

At step 604, a determination is made that the user generates a social networking update that references the media object at a time instance while the user is consuming the media object. In an example implementation, update determination module 704 determines that the user generates the social networking update at the time instance while the user is consuming the media object.

At step 606, a link is automatically inserted in the social networking update. The link references a portion of the media object that corresponds to the time instance. In an example implementation, link insertion module 516' automatically inserts the link in the social networking update.

At step 608, a determination is made whether the social networking update is to be filtered. In an example implementation, filter determination module 706 determines whether the social networking update is to be filtered. If the social networking update is to be filtered, flow continues to step 610. Otherwise, flow continues to step 612.

At step 610, the social networking update is filtered with respect to an update feed associated with the user based on a tag associated with the social networking update. For example, the tag may identify the user who generated the social networking update, the time instance at which the social networking update was generated, the date on which the social networking update was generated, the geographical location of the user, any contextual information associated with the social networking update, a person, place, or thing to which the social networking update pertains, etc. In an example implementation, filtering module 708 filters the social networking update. For instance, filtering module 708 may determine whether to include the social networking update in the update feed associated with the user based on the tag.

At step 612, a determination is made whether to sort the social networking update. In an example implementation, sort determination module 710 determines whether the social networking update is to be sorted. If the social networking update is to be sorted, flow continues to step 614. Otherwise, flow continues to step 616.

At step 614, the social networking update, which is associated with a tag, is sorted with respect to other social networking updates included in the update feed associated with the user based on the tag. For example, the tag may identify the user who generated the social networking update, the time instance at which the social networking update was generated, the date on which the social networking update was generated, the geographical location of the user, any contextual information associated with the social networking update, a person, place, or thing to which the social networking update pertains, etc.

The tag that is used to filter the social networking update at step 610 and the tag that is used to sort the social networking update at step 614 may be the same or different. In an example implementation, sorting module 712 sorts the social networking update. For instance, sorting module 712 may rank the social networking update with respect to other social networking updates in the update feed associated with the user, such that the rankings of the respective social networking updates determine the order in which the social networking updates are provided in the update feed.

At step 616, a determination is made whether an interestingness indicator is to be generated with respect to the media object. In an example implementation, interestingness determination module 714 determines whether an interestingness indicator is to be generated with respect to the media object.

At step 618, an interestingness indicator is generated that includes a plurality of interest values corresponding to a plurality of respective time instances associated with the media object. Each interest value is described as indicating a number of social networking updates generated with respect to a respective time instance that corresponds to that interest value, though the scope of the example embodiments is not limited in this respect. It will be recognized that each interest value may be based on information in addition to or in lieu of the number of social networking updates generated with respect to the respective time instance that corresponds to that interest value. The interest values may be normalized to fit a designated scale, though the scope of the example embodiments is not limited in this respect. In an example implementation, indicator module 716 generates the interestingness indicator.

In some example embodiments, one or more steps 602, 604, 606, 608, 610, 612, 614, 616, and/or 618 of flowchart 600 may not be performed. Moreover, steps in addition to or in lieu of steps 602, 604, 606, 608, 610, 612, 614, 616, and/or 618 may be performed.

It will be recognized that update manager 102″ may not include one or more of media determination module 702, update determination module 704, link insertion module 516', filter determination module 706, filtering module 708, sort determination module 710, sorting module 712, interestingness determination module 714, and/or indicator module 716. Furthermore, update manager 102″ may include modules in addition to or in lieu of media determination module 702, update determination module 704, link insertion module 516', filter determination module 706, filtering module 708, sort determination module 710, sorting module 712, interestingness determination module 714, and/or indicator module 716.

Figure 9:
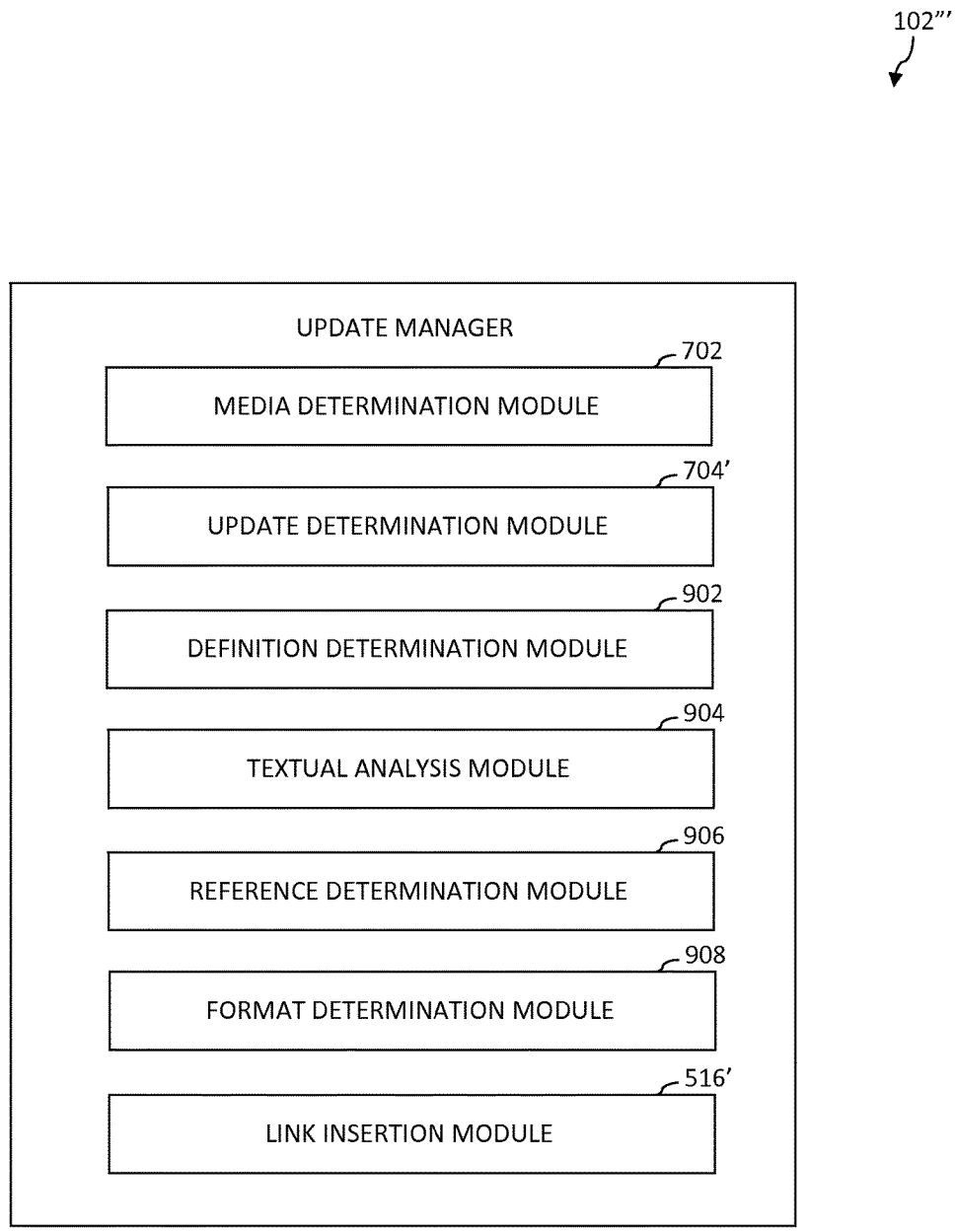

FIG. 8 depicts a flowchart 800 of yet another method for providing a link to a portion of a media object in real time in a social networking update in accordance with an embodiment described herein. Flowchart 800 is described from the perspective of an update manager. Flowchart 800 may be performed by update manager 102 of online system 100 shown in FIG. 1, for example. For illustrative purposes, flowchart 800 is described with respect to an update manager 102‴ shown in FIG. 9, which is an example of an update manager 102, according to an embodiment. As shown in FIG. 9, update manager 102‴ includes a media determination module 702, an update determination module 704', a definition determination module 902, a textual analysis module 904, a reference determination module 906, a format determination module 908, and a link insertion module 516'. Further structural and operational embodiments will be apparent to persons skilled in the relevant art(s) based on the discussion regarding flowchart 800. Flowchart 800 is described as follows.

As shown in FIG. 8, the method of flowchart 800 begins at step 602. In step 602, a determination is made that a user is consuming a media object. In an example implementation, media determination module 702 determines that the user is consuming the media object.

At step 802, a determination is made that the user generates a social networking update at a time instance while the user is consuming the media object. In an example implementation, update determination module 704' determines that the user generates the social networking update at the time instance while the user is consuming the media object.

At step 804, a determination is made whether the user defined a text format to be associated with the media object. For instance, the text format may include a designated combination of textual characters. In an example implementation, definition determination module 902 determines whether the user defined a text format to be associated with the media object. If the user defined a text format, flow continues to step 810. Otherwise, flow continues to step 806.

At step 806, a textual analysis is performed with respect to the social networking update to determine a media indicator that is included in the social networking update. In an example implementation, textual analysis module 904 performs the textual analysis.

At step 808, a determination is made that the social networking update references the media object based on the media indicator specifying the media object. In an example implementation, reference determination module determines that the social networking update references the media object. Upon completion of step 808, flow continues to step 606.

At step 810, a textual analysis is performed with respect to the social networking update. In an example implementation, textual analysis module 904 performs the textual analysis.

At step 812, a determination is made that the social networking update has a textual format defined by the user that indicates that the social networking update references the media object. In an example implementation, format determination module 908 determines that the social networking update has a textual format defined by the user that indicates that the social networking update references the media object. Upon completion of step 812, flow continues to step 606.

At step 606, a link is automatically inserted in the social networking update. The link references a portion of the media object that corresponds to the time instance. In an example implementation, link insertion module 516' automatically inserts the link in the social networking update.

In some example embodiments, one or more steps 602, 802, 804, 806, 808, 810, 812, and/or 606 of flowchart 800 may not be performed. Moreover, steps in addition to or in lieu of steps 602, 802, 804, 806, 808, 810, 812, and/or 606 may be performed.

It will be recognized that update manager 102‴ may not include one or more of media determination module 702, update determination module 704', definition determination module 902, textual analysis module 904, reference determination module 906, format determination module 908, and/or link insertion module 516'. Furthermore, update manager 102‴ may include modules in addition to or in lieu of media determination module 702, update determination module 704', definition determination module 902, textual analysis module 904, reference determination module 906, format determination module 908, and/or link insertion module 516'.

Figure 11:
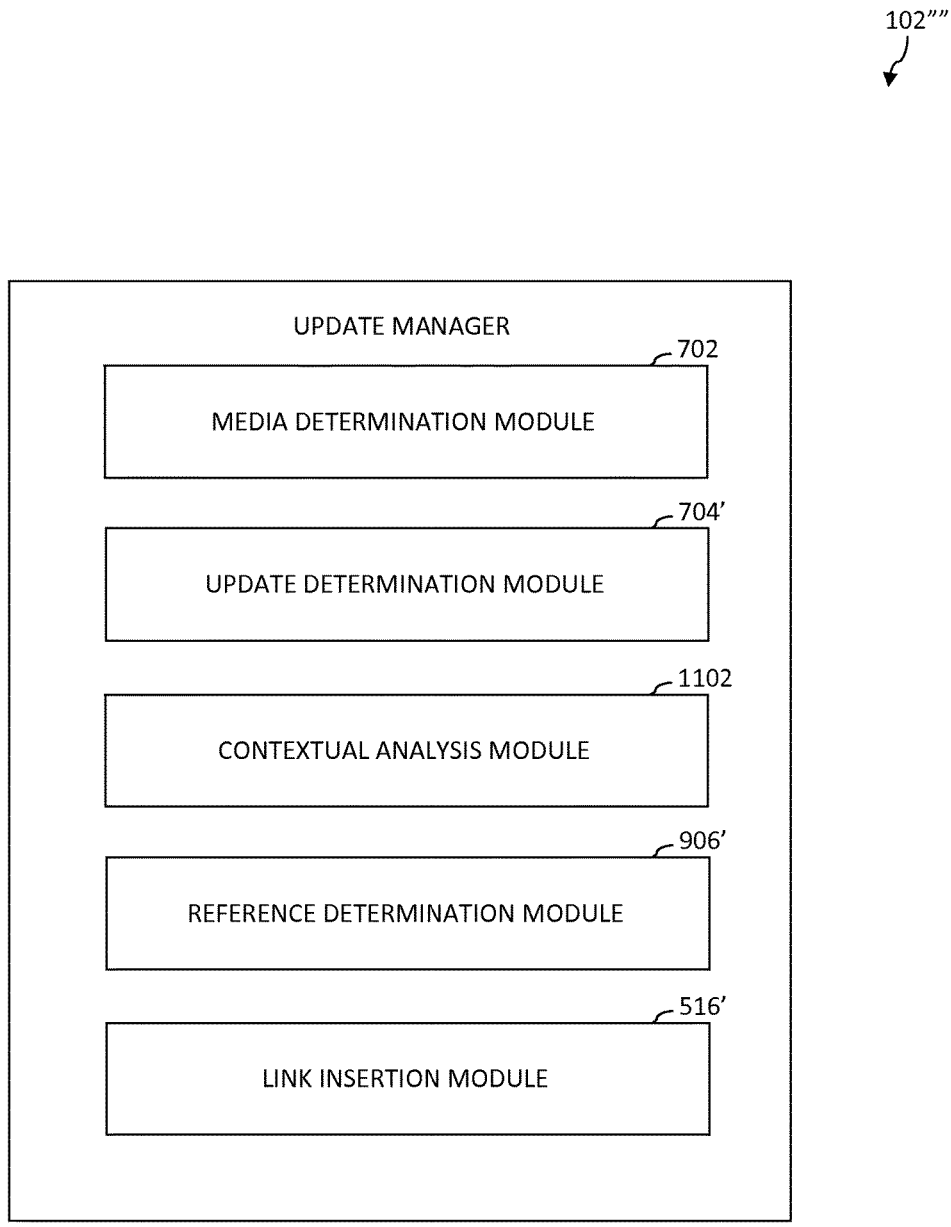

FIG. 10 depicts a flowchart 1000 of still another method for providing a link to a portion of a media object in real time in a social networking update in accordance with an embodiment described herein. Flowchart 1000 is described from the perspective of an update manager. Flowchart 1000 may be performed by update manager 102 of online system 100 shown in FIG. 1, for example. For illustrative purposes, flowchart 1000 is described with respect to an update manager 102⁗ shown in FIG. 11, which is an example of an update manager 102, according to an embodiment. As shown in FIG. 11, update manager 102⁗ includes a media determination module 702, an update determination module 704', a contextual analysis module 1102, a reference determination module 906', and a link insertion module 516'. Further structural and operational embodiments will be apparent to persons skilled in the relevant art(s) based on the discussion regarding flowchart 1000. Flowchart 1000 is described as follows.

As shown in FIG. 10, the method of flowchart 1000 begins at step 602. In step 602, a determination is made that a user is consuming a media object. In an example implementation, media determination module 702 determines that the user is consuming the media object.

At step 802, a determination is made that the user generates a social networking update at a time instance while the user is consuming the media object. In an example implementation, update determination module 704' determines that the user generates the social networking update at the time instance while the user is consuming the media object.

At step 1002, a contextual analysis is performed with respect to the social networking update. The contextual analysis may include determining a geographical location that is associated with the social networking update, determining a time and/or a date at which the social networking update was generated, or any other contextual information regarding the social networking update. In an example implementation, contextual analysis module 1102 performs the contextual analysis.

At step 1004, a determination is made that the social networking update references the media object based on a result of the contextual analysis. For instance, the determination may be based on association of the social networking update and the media object with designated contextual information. In an example implementation, reference determination module 906' determines that the social networking update references the media object.

At step 606, a link is automatically inserted in the social networking update. The link references a portion of the media object that corresponds to the time instance. In an example implementation, link insertion module 516' automatically inserts the link in the social networking update.

FIG. 12 depicts a time line 1200 in accordance with an embodiment described herein. As shown in FIG. 12, a time period, $\tau_{OBJECT}$, is defined by a first start time, $t_{START1}$, and a first end time, $t_{END1}$. The time period, $\tau_{OBJECT}$, may represent duration of a media object that is being consumed by a user, for example. A time instance, $t_{INSTANCE}$, is shown to be included in the time period, $\tau_{OBJECT}$. For example, the time instance, $t_{INSTANCE}$, may represent a point in time at which the user generates a social networking update that references the media object.

Another time period, $\tau_{PORTION}$, is defined by a second start time, $t_{START2}$, and a second end time, $t_{END2}$. The time period, $\tau_{PORTION}$, may represent duration of a portion of the media object that corresponds to the time instance, $t_{INSTANCE}$. Thus, the time period, $\tau_{PORTION}$, includes the time instance, $t_{INSTANCE}$. Moreover, the time period, $\tau_{PORTION}$, is less than the time period, $\tau_{OBJECT}$.

The time period, $\tau_{PORTION}$, may be a predetermined period of time, though the scope of the example embodiments is not limited in this respect. For instance, the duration of the time period, $\tau_{PORTION}$, may (or may not) be determined before the user generates the social networking update that references the media object. The second start time, $t_{START2}$, is a first amount of time, $t_A$, prior to the instance, $t_{INSTANCE}$. The second end time, $\Delta t_{END2}$, is a second amount of time, $\Delta t_B$, after the instance, $t_{INSTANCE}$.

In accordance with some example embodiments, the first amount of time, $t_A$, is a first predetermined amount of time prior to the instance, $t_{INSTANCE}$. In accordance with some example embodiments, the second end time, $t_{END2}$, is a second predetermined amount of time after the instance, $t_{INSTANCE}$. The first predetermined amount of time and the second predetermined amount of time may be the same or different. In accordance with some example embodiments, the first predetermined amount of time and/or the second predetermined amount of time are defined by the user.

III. Example Computer Implementation

The embodiments described herein, including systems, methods/processes, and/or apparatuses, may be implemented using well known computers, such as computer 1300 shown in FIG. 13. For example, elements of example computer system 100, including update manager 102 depicted in FIGS. 1, 5, 7, 9, and 11 and elements thereof, user systems 108A-108N depicted in FIG. 1, and each of the steps of flowcharts 400, 600, 800, and 1000 depicted in respective FIGS. 4A-4C, 6, 8, and 10, can each be implemented using one or more computers 1300.

Computer 1300 can be any commercially available and well known computer capable of performing the functions described herein, such as computers available from International Business Machines, Apple, Sun, HP, Dell, Cray, etc. Computer 1300 may be any type of computer, including a desktop computer, a server, etc.

As shown in FIG. 13, computer 1300 includes one or more processors (e.g., central processing units (CPUs)), such as processor 1306. Processor 1306 may include any one or more of clients 110A-110N depicted in FIG. 1; interface module 502 depicted in FIG. 5, update capture module 504 depicted in FIG. 5; update analysis module 506 depicted in FIG. 5; context capture module 508 depicted in FIG. 5; matching module 510 depicted in FIG. 5; media portion capture module 512 depicted in FIG. 5; link insertion module 516 depicted in FIGS. 5, 7, 9, and 11; determination module 518 depicted in FIG. 5; distribution module 520 depicted in FIG. 5; serving module 522 depicted in FIG. 5; media determination module 702 depicted in FIGS. 7, 9, and 11; update determination module 704 depicted in FIGS. 7, 9, and 11; filter determination module 706 depicted in FIG. 7; filtering module 708 depicted in FIG. 708; sort determination module 710 depicted in FIG. 7; sorting module 712 depicted in FIG. 7; interestingness determination module 714 depicted in FIG. 7; indicator module 716 depicted in FIG. 7; definition determination module 902 depicted in FIG. 9; textual analysis module 904 depicted in FIG. 9; reference determination module 906 depicted in FIGS. 9 and 11; format determination module 908 depicted in FIG. 9; or contextual analysis module 1102 depicted in FIG. 11; or any portion or combination thereof, for example, though the scope of the embodiments is not limited in this respect.

Processor 1306 is connected to a communication infrastructure 1402, such as a communication bus. In some embodiments, processor 1306 can simultaneously operate multiple computing threads.

Computer 1300 also includes a primary or main memory 1308, such as a random access memory (RAM). Main memory has stored therein control logic 1324A (computer software), and data.

Computer 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, computer 1300 may include an industry standard interface, such as a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1324B (control logic) and/or data. Removable storage unit 1316 represents a floppy disk, magnetic tape, compact disc (CD), digital versatile disc (DVD), Blue-ray disc, optical storage disk, memory stick, memory card, or any other computer data storage device. Removable storage drive 1314 reads from and/or writes to removable storage unit 1316 in a well known manner.

It will be apparent to persons skilled in the relevant art(s) that storing module 514 of FIG. 5 may be included in main memory 1308, secondary memory 1310, removable storage unit 1316, or some combination thereof, though the scope of the embodiments is not limited in this respect.

Computer 1300 also includes input/output/display devices 1304, such as monitors, keyboards, pointing devices, etc.

Computer 1300 further includes a communication or network interface 1320. Communication interface 1320 enables computer 1300 to communicate with remote devices. For example, communication interface 1320 allows computer 1300 to communicate over communication networks or mediums 1322 (representing a form of a computer useable or readable medium), such as local area networks (LANs), wide area networks (WANs), the Internet, etc. Network interface 1320 may interface with remote sites or networks via wired or wireless connections. Examples of communication interface 1322 include but are not limited to a modem, a network interface card (e.g., an Ethernet card), a communication port, a Personal Computer Memory Card International Association (PCMCIA) card, etc.

Control logic 1324C may be transmitted to and from computer 1300 via the communication medium 1322.

Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, cause such data processing devices to operate as described herein, represent embodiments of the invention.

For example, each of clients 110A-110N depicted in FIG. 1 and each of the elements of example update manager 102, including interface module 502 depicted in FIG. 5, update capture module 504 depicted in FIG. 5; update analysis module 506 depicted in FIG. 5; context capture module 508 depicted in FIG. 5; matching module 510 depicted in FIG. 5; media portion capture module 512 depicted in FIG. 5; link insertion module 516 depicted in FIGS. 5, 7, 9, and 11; determination module 518 depicted in FIG. 5; distribution module 520 depicted in FIG. 5; serving module 522 depicted in FIG. 5; media determination module 702 depicted in FIGS. 7, 9, and 11; update determination module 704 depicted in FIGS. 7, 9, and 11; filter determination module 706 depicted in FIG. 7; filtering module 708 depicted in FIG. 708; sort determination module 710 depicted in FIG. 7; sorting module 712 depicted in FIG. 7; interestingness determination module 714 depicted in FIG. 7; indicator module 716 depicted in FIG. 7; definition determination module 902 depicted in FIG. 9; textual analysis module 904 depicted in FIG. 9; reference determination module 906 depicted in FIGS. 9 and 11; format determination module 908 depicted in FIG. 9; contextual analysis module 1102 depicted in FIG. 11; and each of the steps of flowcharts 400, 600, 800, and 1000 depicted in respective FIGS. 4A-4C, 6, 8, and 10 can be implemented as control logic that may be stored on a computer useable medium or computer readable medium, which can be executed by one or more processors to operate as described herein.

The invention can be put into practice using software, hardware, and/or operating system implementations other than those described herein. Any software, hardware, and operating system implementations suitable for performing the functions described herein can be used.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   determining, by a processor associated with a social networking server, that a user is consuming a media object;
   identifying, via the processor, an update feed of a social networking platform hosted by the social networking server, said update feed comprising a plurality of social networking updates generated by the user and a plurality of other users;
   analyzing, via the processor, the identified update feed by parsing the update feed to identify each social networking update contained therein, and based on said analysis, identifying a social networking update generated by the user, said social networking update comprising content generated by the user;
   performing, via the processor, textual and contextual analysis on the identified social networking update, said textual analysis comprising analyzing text within the content of the identified social network update, and based on said analysis of the text, identifying a media indicator associated with said media object within said content, said contextual analysis comprising analyzing characteristics of the content and determining, based on said analysis of the characteristics, that the social networking update references the media object;
   determining, by the processor, that the social networking update references said media object based on identification of said media indicator, said determination further comprising identifying a time instance while the user is consuming the media object;
   parsing, via the processor, the media object, and based on said parsing, capturing, by the processor, a portion of the media object that corresponds to the time instance;
   modifying, via the processor, the social networking update based on said capturing, said modifying comprising automatically inserting, by the processor, a link in the social networking update that references the captured portion of the media object; and
   forwarding, by the processor of the social networking server, the modified social networking update to a follower of the user.

2. The method of claim 1, wherein the determining that the user generates the social networking update that references the media object comprises:

determining that the social networking update has a textual format defined by the user that indicates that the social networking update references the media object.

3. The method of claim 1, wherein the portion of the media object corresponds to a predetermined time period that includes the time instance.

4. The method of claim 3, wherein the predetermined time period has a start time that is a first predetermined amount of time prior to the time instance and an end time that is a second predetermined amount of time after the time instance.

5. The method of claim 4, wherein the first predetermined amount of time and the second predetermined amount of time are defined by the user.

6. The method of claim 1, further comprising:
filtering the social networking update with respect to an update feed associated with the user based on a tag associated with the social networking update.

7. The method of claim 1, further comprising:
sorting the social networking update, which is associated with a tag, with respect to other social networking updates included in an update feed associated with the user based on the tag.

8. The method of claim 1, further comprising:
generating an interestingness indicator that includes a plurality of interest values corresponding to a plurality of respective time instances associated with the media object.

9. The method of claim 8, wherein each interest value indicates a number of social networking updates generated with respect to the time instance that corresponds to that interest value.

10. A social networking server comprising:
a processor; and
a non-transitory computer-readable storage medium for tangibly storing thereon program logic for execution by the processor, the stored program logic comprising:
logic executed by the processor for determining that a user is consuming a media object;
logic executed by the processor for identifying an update feed of a social networking platform hosted by the social networking server, said update feed comprising a plurality of social networking updates generated by the user and a plurality of other users;
logic executed by the processor for analyzing the identified update feed by parsing the update feed to identify each social networking update contained therein, and based on said analysis, identifying a social networking update generated by the user, said social networking update comprising content generated by the user;
logic executed by the processor for performing textual and contextual analysis on the identified social networking update, said textual analysis comprising analyzing text within the content of the identified social network update, and based on said analysis of the text, identifying a media indicator associated with said media object within said content, said contextual analysis comprising analyzing characteristics of the content and determining, based on said analysis of the characteristics, that the social networking update references the media object;
logic executed by the processor for determining that the social networking update references said media object based on identification of said media indicator, said determination further comprising identifying a time instance while the user is consuming the media object;
logic executed by the processor for parsing the media object, and based on said parsing, capturing a portion of the media object that corresponds to the time instance;
logic executed by the processor for modifying the social networking update based on said capturing, said modifying comprising automatically inserting a link in the social networking update that references the captured portion of the media object; and
logic executed by the processor for forwarding, the social networking server, the modified social networking update to a follower of the user.

11. The social networking server of claim 10, wherein the update determination logic comprises:
format determination logic executed by the processor for determining that the social networking update has a textual format defined by the user that indicates that the social networking update references the media object.

12. The social networking server of claim 10, wherein the portion of the media object corresponds to a predetermined time period that includes the time instance.

13. The social networking server of claim 12, wherein the predetermined time period has a start time that is a first predetermined amount of time prior to the time instance and an end time that is a second predetermined amount of time after the time instance.

14. The social networking server of claim 13, wherein the first predetermined amount of time and the second predetermined amount of time are defined by the user.

* * * * *